United States Patent [19]

Huber et al.

[11] Patent Number: 5,020,496
[45] Date of Patent: Jun. 4, 1991

[54] APPARATUS HAVING A CONTROL MOTOR FOR INTERVENTION INTO A FORCE TRANSMISSION DEVICE

[75] Inventors: Werner Huber, Schwaikheim; Guenter Spiegel, Worms, both of Fed. Rep. of Germany

[73] Assignee: Robert Bosch GmbH, Stuttgart, Fed. Rep. of Germany

[21] Appl. No.: 568,813

[22] Filed: Aug. 17, 1990

[30] Foreign Application Priority Data

Oct. 18, 1989 [DE] Fed. Rep. of Germany ....... 3934739

[51] Int. Cl.$^5$ ................................................. F02D 7/00
[52] U.S. Cl. ..................................... 123/399; 123/396; 123/342; 180/197
[58] Field of Search ............... 123/399, 360, 361, 396, 123/342, 350, 352, 336; 180/197; 74/858

[56] References Cited

U.S. PATENT DOCUMENTS

| | | | |
|---|---|---|---|
| 4,224,907 | 9/1980 | Lefeuvre et al. | 123/352 |
| 4,419,973 | 12/1983 | Collonia | 123/396 |
| 4,461,254 | 7/1984 | Pfahzgraf et al. | 123/350 |
| 4,531,430 | 7/1985 | Holmes | 74/858 |
| 4,747,461 | 5/1988 | Hayn et al. | 180/197 |
| 4,750,582 | 6/1988 | Maas | 180/197 |
| 4,785,781 | 11/1988 | Pfahzgraf | 123/396 |
| 4,848,297 | 7/1989 | Hickmann et al. | 123/399 |
| 4,848,505 | 7/1989 | Yoshizawa et al. | 180/197 |
| 4,864,992 | 9/1989 | Onishi et al. | 123/360 |
| 4,873,957 | 10/1989 | Ueyama et al. | 123/399 |
| 4,892,071 | 1/1990 | Asayama | 123/336 |
| 4,966,114 | 10/1990 | Barton | 123/396 |

FOREIGN PATENT DOCUMENTS 2186024 8/1987 United Kingdom ................ 123/399

Primary Examiner—Raymond A. Nelli
Attorney, Agent, or Firm—Edwin E. Greigg; Ronald E. Greigg

[57] ABSTRACT

A control device of a driving engine which can be actuated purely mechanically, via a force transmission device or a control motor as needed, independently of a control position of the force transmission device in a direction of reduced output of the driving engine. The control device includes a restoring spring, a third driver element and a repose stop positioned away from the control device, in a final control element. The apparatus is particularly well-suited for motor vehicles equipped with traction control.

23 Claims, 1 Drawing Sheet

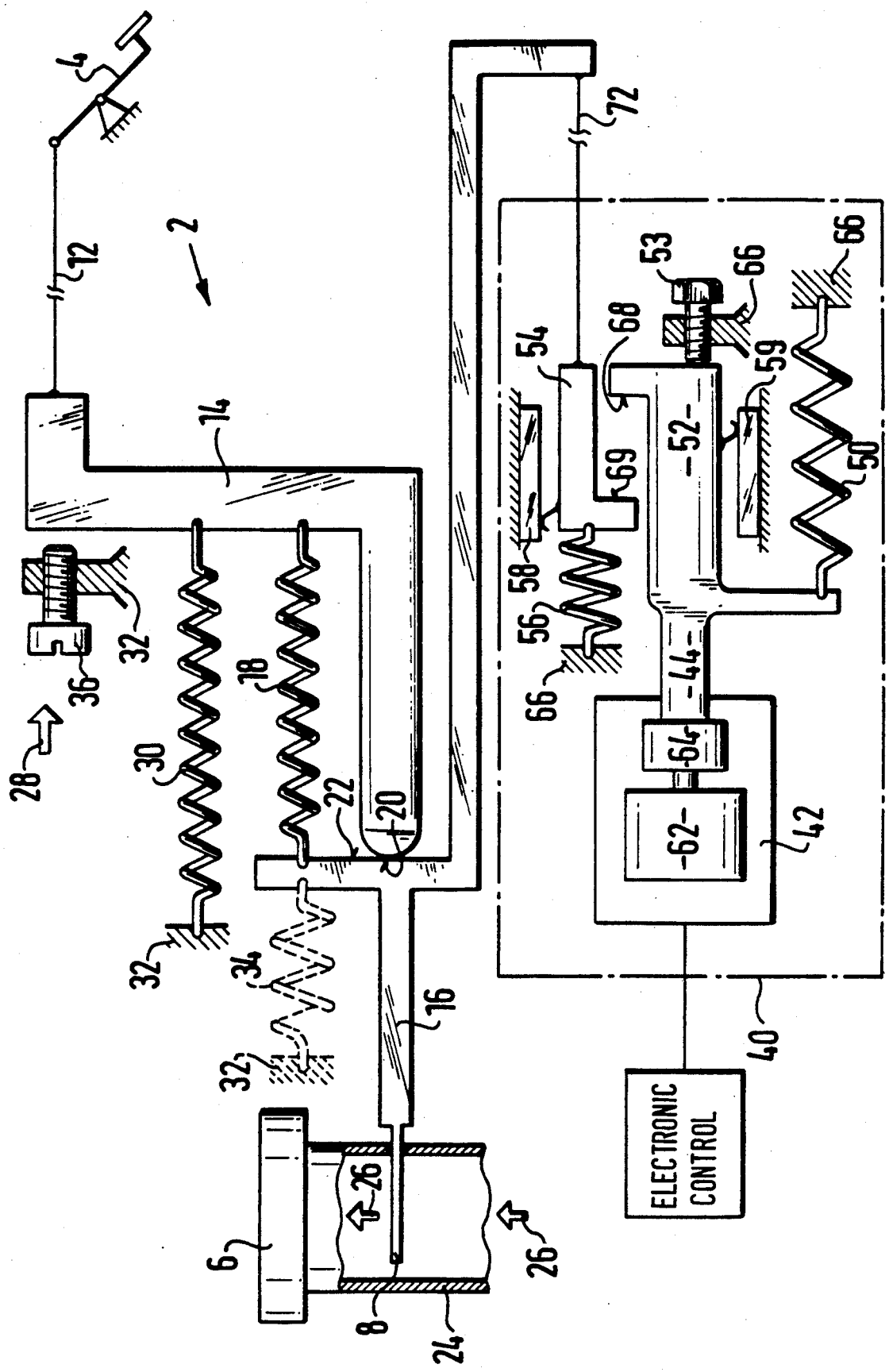

APPARATUS HAVING A CONTROL MOTOR FOR INTERVENTION INTO A FORCE TRANSMISSION DEVICE

RELATED APPLICATIONS

This application relates to subject matter generally similar to other applications filed simultaneously by the same assignee, the applications being identified by German Patent Application Nos. P 39 34 738.9 and P 39 34 737.0, further Ser. No. 07/569,051, filed in the U.S. Patent and Trademark Office on Aug. 17, 1990.

BACKGROUND OF THE INVENTION

The invention is based on an apparatus having a control motor for intervention into a force transmission device, between an operating element and a control device that determines the output of a driving engine, as defined hereinafter.

For various closed-loop control tasks in driving engines, intervention into the force transmission device between the operating element, such as a gas pedal, and the control device, such as a throttle valve in an Otto engine or a control lever of a Diesel engine or the like, is necessary. One reason for an adjustment may for instance be to avoid slip between wheels of a motor vehicle that are driven by the driving engine and a road surface.

A known apparatus includes a first driver element connected to the operating element, a second driver element connected to the control device, a third driver element via which the control motor can act upon the control device, and a restoring spring that can actuate the third driver element counter to a reposed stop are combined in the region of the control device. If the control device is a throttle valve, then the aforementioned components are located directly on the intake tube of the auto engine. However, very cramped conditions often prevail in the region of the intake tube, making it difficult to create sufficient installation space for the known apparatus; that is, it is impossible to select an optimal disposition for the intake tube.

OBJECTS AND SUMMARY OF THE INVENTION

The apparatus according to the invention has an advantage over the prior art that with it, very favorable and flexible installation conditions are created.

The intermediate part connected to the second driver element by a force transmission means offers the special advantage that it enables an arbitrarily selectable spatial separation between the third driver element of the control device. As a result, the apparatus according to the invention can advantageously be used even in very cramped installation conditions in the region of the control device; that is, there is greater freedom in the disposition of the control device, because advantageously, the third driver element is not rigidly connected to the control device.

The disposition of the restoring spring in the final control element likewise advantageously increases the freedom in disposition of the control device.

The disposition of an actual-value transducer in the final control element simplifies detection of the control position in an advantageous manner, because the expenditure for control and electrical purposes is reduced.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing shows an exemplary embodiment of the invention in simplified form.

DESCRIPTION OF THE PREFERRED EMBODIMENTS

The structure and operation of an apparatus according to the invention in an engine, in particular in a vehicle, having a control motor for intervention into a force transmission device 2 between an operating element 4, such as a gas pedal, and a control device 8 that determines the output of a driving engine 6, will now be described in further detail in terms of a preferred exemplary embodiment shown in the drawing.

The apparatus according to the drawing can be used in any machine including a driving engine 6, in which closed-loop control of the driving engine 6 is to be effected. The machine may either be mounted in stationary fashion or may for instance be a self-propelled machine or in other words a vehicle. Although not restricted solely to this, for the sake of simplicity it will be assumed in the description of the exemplary embodiment that the apparatus according to the invention is to be installed in a vehicle having an Otto engine.

The force transmission device 2 substantially includes a force transmission element 12, a first driver element 14, a second driver element 16 and a coupling spring 18.

The first driver element 14 is connected to the operating element 4 by the force transmission element 12, and the control device 8 is connected to the second driver element 16. The coupling spring 18 acts at one end on the first driver element 14 10 and at the other on the second driver element 16, in such a way that both driver elements 14, 16 are urged to execute a motion relative to one other until a first coupling stop 20 of the first driver element 14 comes to rest against a second coupling stop 22 of the second driver element 16.

The control device 8 is for instance a throttle valve 8 installed in an intake tube 24. Depending on the control position of the throttle valve 8, a flow, represented symbolically by arrows 26, for instance of a mixture flowing through the intake tube 24 to the driving engine 6 can be varied. In this way, the output of the driving engine 6 is controlled via the control position of the throttle valve 8. Actuation of the throttle valve 8 in the direction of an arrow 28 shown in the drawing represents an increase in the output of the driving engine 6, and actuation of the throttle valve 8 counter to the direction of the arrow 28 represents a reduction in the output of the driving engine 6. In the drawing, all the movable components are shown in such a way that their directions of motion extend parallel to the arrow 28, or in other words are either in or counter to the direction of the arrow 28. By means of the operating element 4, the control device 8 can be actuated via the force transmission device 2 in the direction of the arrow 28. The control device 8 can be actuated counter to the direction of the arrow 28 by a restoring spring 30 provided on the transmission device 2. The restoring spring 30 acts at one end on a wall 32 and on the other, on the first driver element 14. The restoring spring 30 acts on the first driver element 14 counter to the direction of the arrow 28. In addition to or instead of the restoring spring 30, some other restoring spring 34, shown in dashed lines, may also be provided. The restoring spring 34 likewise acts on one end on the wall 32, and on the other it acts on the second driver element 16 counter to the direction of the arrow 28. Depending on the actuation of the operating element 4, the two restoring springs 30, 34 can actuate the driver elements 14, 16 and the throttle valve 8 counter to the direction of the arrow 28, until one of these latter elements comes to rest on an adjustable idling stop 36. In the exemplary embodiment, the first driver element 14 can be made to contact the idling stop 36.

The force of the coupling spring is is dimensioned such that without influence by a control element 40 on the force transmission device 2, the first coupling stop 20 of the first driver element 14 rests constantly on a second coupling stop 22 of the second driver element 16, and a control position of the operating element 4 can be transmitted to the control device 8 via the force transmission device 2.

Additionally, there is also the final control element 40. The final control element 40 substantially includes a control motor 42 having an operating member 44, a restoring spring 50, a third driver element 52, a repose stop 53, an intermediate part 54, and optionally a tension spring 56, an actual-value transducer 58 and/or an actual-value transducer 59.

The control motor 42 may be a rotary motor, for example, and the operative member 44 is a rotor shaft; alternatively, the control motor 42 may be a linear motor, such a hydraulic cylinder, and the operative member 44 in this case is a piston rod. The operative member 44 may be the rotor shaft of the control motor directly, for example, or a gear 64 can be interposed between the operative member 44 and an actual motor 62 of the control motor 42. In this latter case, the operative member 44 is an output shaft of the gear 64. The operative member 44 is connected to the third driver element 52.

The restoring spring 50 acts at one end on a housing 66 of the final control element 40 and at the other on the operative member 44, or on the third driver element 52, in the direction of the arrfow 28, with the tendency of actuating the third driver element 52 toward the repose stop 53. The third driver element 52 has a stop shoulder 68 and the intermediate part 54 on the other hand has a stop shoulder 69. Upon actuation of the third driver element 52 counter to the direction of the arrow 28, the stop shoulder 68 of the third driver element 52 can come to rest on the stop shoulder 69 of the intermediate part 54, depending on the control position of the intermediate part 54. If the third driver element 52 is actuated beyond this rest point counter to the direction of the arrow 28, then the intermediate part 54 is likewise carried along with the driver part 54 counter to the direction of the arrow 28.

The intermediate part 54 of the final control element 40 is connected to the second driver element 16 of the force transmission device 2 via a transmission means 72. The transmission means 72 may be a rod assembly, is a Bowden cable, a sheathed cable, or the like. If the transmission means 72 is a Bowden cable or a sheathed cable, for instance, then the tension spring 56 provided in the final control element 40 and acting on the intermediate part 54 counter to the direction of the arrow 28 assures a minimum tension in the transmission means 72; that is, the tension spring 56 prevents sagging of the sheathed cable, for instance. The tension spring 56 may be relatively weak, because it need merely compensate substantially for frictional forces. The tension spring 56 may also be dispensed with, depending on the embodiment of the transmission means 72.

With the aid of the actual-value transducer 58, a control position of the intermediate part 54 of the final control element 40, and thus at least indirectly a control position of the second driver element 16 and of the control device 8, can be detected. In the region of the control device 8, an actual-value transducer is already often provided for detecting a control position of the control device 8, for instance in order to regulate gasoline metering, but for electrical reasons it is poorly suited to detect the control position of the control device 8 for the sake of triggering the control motor 42. Since cramped installation conditions often prevail in the region of the control device 8, it is particularly favorable to dispose the actual-value transducer 58 in the region of the final control element 40. Since upon triggering of the control motor 42 the stops 68, 69 of the third driver element 52 and of the intermediate part 54 come to rest upon one other, the actual-value transducer 58 can also be replaced with the actual-value transducer 59. The actual-value transducer 59 detects a control position of the third driver element 52. For safety reasons, for instance, it may also be favorable to provide a plurality of actual-value transducers 58, 59.

In the apparatus according to the invention, a distinction can be made between two operating states. The first operating state is the unregulated operating state. In the first operating state, the control device 8 can be moved into any desired control position by the operating element 4 without influence by the final control element 40. In the first operating state, the third driver element 52 rests on the repose stop 53. Because of the transmission means 72 and because of the optionally present tension spring 56, the intermediate part 54 moves in the same direction as the second driver element 16 upon actuation of the operating element 4. Because there is a spacing between the two shoulder stops 68, 69 of the third driver element 52 and of the intermediate part 54, the shoulder stop 69 of the intermediate part 54 does not come to rest on the shoulder stop 68 of the third driver element 52 in the first operating state.

Upon actuation of the control device 8 by the operating element 4 in the direction of the arrow 28, the output produced by the driving engine 6 is increased. In this process it may happen that sensors, not shown, detect slip between driven wheels, not shown, and some road surface. The slip is highly undesirable. To avoid slip, the control motor 42 of the final control element 40 is triggered via electronics, not shown. In that case, the apparatus according to the invention operates in its second operating state, which can accordingly be called the regulated operating state. In the second operating state, the control motor 42 actuates the third driver element 52 counter to the arrow 28, and shoulder stop 68 of the third driver element 52 can come to rest on the shoulder stop 69 of the intermediate part 54. If the third driver element 52 is actuated beyond this counter to the direction of the arrow 28, then the intermediate part 52, and by it via the transmission element 72, the second driver element 16 and thus the control device 8 are all actuated counter to the direction of the arrow 28, or in other words in the direction of a reduced output of the driving engine 6. The control device 8 is actuated far enough counter to the direction of the arrow 28 that the sensors (not shown) do not detect inadmissibly high slip between the driven wheels and the road surface.

Depending on the embodiment, the transmission means 72 may be located very flexibly. The fact that the third driver element 52 with its shoulder stop 68 and the intermediate part 54 with its shoulder stop 69, as well as the restoring spring 50 and the repose stop 53, can all be disposed spatially independently of the intake tube 24 advantageously makes installation of the intake tube 24 and control device 8 considerably simpler. It is furthermore particularly advantageous to combine the third driver element 52, the intermediate part 54, the restoring spring 50 and repose stop 53, or at least some of these parts, with the control motor 42 in the final control element 40. The final control element 40 is preferably a compact unit, which can be disposed if needed with variable spacing with respect to the intake tube 24. The connection between the final control element 40 and the transmission device 2 is effected by the transmission means 72.

Compared with the other restoring spring 34, the restoring spring 30 has the advantage that the coupling spring 18 can be made weaker. Moreover, in the second operating state, the influence of the final control element 40 on the operating element 4 is weaker, and the force to be brought to bear by the final control element 40 in the second operating state is less. The tension spring 56 is advantageously selected to be weak enough that at most it can overcome a friction in the region of the intermediate part 54 and transmission means 72, but cannot exert any significant influence on the force transmission device 2 and in particular on the coupling spring 18.

The apparatus according to the invention has been described in terms of an exemplary embodiment having linear directions of motion parallel to the arrow 28. In another exemplary embodiment of the same apparatus according to the invention, at least some individual components do not move linearly but instead are pivotably supported. A motion in the direction of the arrow 28 then represents rotation in one direction, and a motion counter to the direction of the arrow 28 represents rotation in the opposite direction. Since the control device 8 is typically rotatably supported, it is a logical option to support the other components rotatably as well. 0 The foregoing relates to a preferred exemplary embodiment of the invention, it being understood that other variants and embodiments thereof are possible within the spirit and scope of the invention, the latter being defined by the appended claims.

WHAT IS CLAIMED AND DESIRED TO BE SECURED BY LETTERS PATENT OF THE UNITED STATES IS:

1. An apparatus having a control motor (42) for intervention into a force transmission device (2) between an operating element (4) and a control device (8) that determines an output of a driving engine (6), said operating element is operatively connected to a first driver element (14) and said control device is operatively connected to a second driver element (16), a coupling spring (18) connected between said first and second driver elements, said coupling spring acts on one end on the first driver element and on the other on the second driver element such that said first and second driver elements are urged to execute a motion relative to one another until a coupling stop (20) of one driver element comes to rest on a coupling stop of the other drive element, said control motor, upon a desired intervention, can act via a third driver element (52) upon said second driver element (16) in a direction of reducing an output of the driving engine, an intermediate part (54) operatively connected to said second driver element (16) via a transmission means (72) via which said third driver element (52) can act upon the second driver element (16), said control motor (42), third driver element (52) and intermediate part (54) form parts of a final control element (40) that can be disposed spaced apart from the control device (8).

2. An apparatus as defined by claim 1, in which said second driver element (16) is firmly connected to the control device (8).

3. An apparatus as defined by claim 1, in which said third driver element (52) is actuated by a restoring spring (50) counter to the direction of a reduction in output of said engine, in the direction of a repose stop (53), and said restoring spring (50) and said repose stop (53) form parts of the final control element (40).

4. An apparatus as defined by claim 2, in which said third driver element (52) is actuated by a restoring spring (50) counter to the direction of a reduction in output of said engine, in the direction of a repose stop (53), and said restoring spring (50) and said repose stop (53) form parts of the final control element (40).

5. An apparatus as defined by claim 1, which includes a restoring spring (30) that acts upon said first driver element (14) in a direction of a reduction in output of the driving engine (6).

6. An apparatus as defined by claim 2, which includes a restoring spring (30) that acts upon said first driver element (14) in a direction of a reduction in output of the driving engine (6).

7. An apparatus as defined by claim 3, which includes a restoring spring (30) that acts upon said first driver element (14) in a direction of a reduction in output of the driving engine (6).

8. An apparatus as defined by claim 4, which includes a restoring spring (30) that acts upon said first driver element (14) in a direction of a reduction in output of the driving engine (6).

9. An apparatus as defined by claim 1, which includes a restoring spring (34) that acts upon said second driver element (16) in a direction of a reduction in output of the driving engine (6).

10. An apparatus as defined by claim 2, which includes a restoring spring (34) that acts upon said second driver element (16) in a direction of a reduction in output of the driving engine (6).

11. An apparatus as defined by claim 3, which includes a restoring spring (34) that acts upon said second driver element (16) in a direction of a reduction in output of the driving engine (6).

12. An apparatus as defined by claim 5, which includes a restoring spring (34) that acts upon said second driver element (16) in a direction of a reduction in output of the driving engine (6).

13. An apparatus as defined by claim 1, which includes a tension spring (56) provided in the final control element (40) that assures a minimum tension in the transmission means (72).

14. An apparatus as defined by claim 2, which includes a tension spring (56) provided in the final control element (40) that assures a minimum tension in the transmission means (72).

15. An apparatus as defined by claim 3, which includes a tension spring (56) provided in the final control element (40) that assures a minimum tension in the transmission means (72).

16. An apparatus as defined by claim 5, which includes a tension spring (56) provided in the final control element (40) that assures a minimum tension in the transmission means (72).

17. An apparatus as defined by claim 9, which includes a tension spring (56) provided in the final control element (40) that assures a minimum tension in the transmission means (72).

18. An apparatus as defined by claim 1, in which said final control element (40) includes at least one actual-value transducer (58, 59), with which a control position of the control device (8) is detectable.

19. An apparatus as defined by claim 2, in which said final control element (40) includes at least one actual-value transducer (58, 59), with which a control position of the control device (8) is detectable.

20. An apparatus as defined by claim 3, in which said final control element (40) includes at least one actual-value transducer (58, 59), with which a control position of the control device (8) is detectable.

21. An apparatus as defined by claim 5, in which said final control element (40) includes at least one actual-value transducer (58, 59), with which a control position of the control device (8) is detectable.

22. An apparatus as defined by claim 9, in which said final control element (40) includes at least one actual-value transducer (58, 59), with which a control position of the control device (8) is detectable.

23. An apparatus as defined by claim 13, in which said final control element (40) includes at least one actual-value transducer (58, 59), with which a control position of the control device (8) is detectable.

* * * * *